(12) United States Patent
Shin et al.

(10) Patent No.: US 10,573,880 B2
(45) Date of Patent: Feb. 25, 2020

(54) CATHODE ACTIVE MATERIAL FOR SECONDARY BATTERY WITH ENHANCED LIFESPAN CHARACTERISTICS AND METHOD OF PREPARING THE SAME

(71) Applicant: LG Chem, Ltd., Seoul (KR)

(72) Inventors: Sun Sik Shin, Daejeon (KR); Hye Lim Jeon, Daejeon (KR); Bo Ram Lee, Daejeon (KR); Hong Kyu Park, Daejeon (KR)

(73) Assignee: LG Chem, Ltd. (KR)

( * ) Notice: Subject to any disclaimer, the term of this patent is extended or adjusted under 35 U.S.C. 154(b) by 343 days.

(21) Appl. No.: 14/533,528

(22) Filed: Nov. 5, 2014

(65) Prior Publication Data
US 2015/0056508 A1    Feb. 26, 2015

Related U.S. Application Data

(63) Continuation of application No. PCT/KR2013/004931, filed on Jun. 4, 2013.

(30) Foreign Application Priority Data

Jun. 4, 2012 (KR) .................. 10-2012-0059526

(51) Int. Cl.
*H01M 4/131* (2010.01)
*H01M 4/36* (2006.01)
*H01M 4/58* (2010.01)

(52) U.S. Cl.
CPC .......... *H01M 4/131* (2013.01); *H01M 4/364* (2013.01); *H01M 4/58* (2013.01)

(58) Field of Classification Search
CPC ........ H01M 4/131; H01M 4/364; H01M 4/58; H01M 4/366; H01M 4/485; H01M 4/505; H01M 4/525; C01G 23/005; C01G 45/1257; C01G 51/50
See application file for complete search history.

(56) References Cited

U.S. PATENT DOCUMENTS

2004/0258836 A1    12/2004    Besenhard et al.
2007/0218363 A1*   9/2007    Paulsen .................. C01G 51/42
                                                         429/231.3

(Continued)

FOREIGN PATENT DOCUMENTS

CN    101438436 A    5/2009
JP    2007-280836    10/2007

(Continued)

OTHER PUBLICATIONS

West, W.C., et al., "Preparation of high quality layered-layered composite Li2MnO3—LiMO2 (M=Ni, Mn, Co) Li-ion cathodes by a ball milling-annealing process" Journal of Power Sources, vol. 204, 2012, pp. 200-204.

(Continued)

*Primary Examiner* — Stephen J Yanchuk
(74) *Attorney, Agent, or Firm* — Lerner, David, Littenberg, Krumholz & Mentlik, LLP

(57) ABSTRACT

Disclosed is a cathode active material in which lithium cobalt oxide particles and manganese (Mn) or titanium (Ti)-containing lithium transition metal oxide particles co-exist and a method of preparing the same.

9 Claims, 4 Drawing Sheets

(56) References Cited

U.S. PATENT DOCUMENTS

| | | | | |
|---|---|---|---|---|
| 2010/0028768 A1* | 2/2010 | Morita | ............... | H01M 2/1653 429/144 |
| 2010/0209771 A1* | 8/2010 | Shizuka | ............... | B82Y 30/00 429/207 |
| 2011/0070497 A1 | 3/2011 | Deguchi | | |
| 2012/0273737 A1 | 11/2012 | Ooishi | | |
| 2012/0321955 A1 | 12/2012 | Yasuda et al. | | |
| 2014/0367610 A1* | 12/2014 | Noguchi | ............... | H01M 4/505 252/182.1 |

FOREIGN PATENT DOCUMENTS

| | | |
|---|---|---|
| JP | 2011134670 A | 7/2011 |
| JP | 2011-159639 A | 8/2011 |
| JP | 2011-228052 A | 11/2011 |
| JP | 2012-038539 A | 2/2012 |
| KR | 10-0693822 B1 | 3/2007 |
| KR | 2011-0025777 A | 3/2011 |
| WO | 2011043296 A1 | 4/2011 |
| WO | 2012029730 A1 | 3/2012 |

OTHER PUBLICATIONS

Kosova, et al., "LiMn2O4 and LiCoO2 composite Cathode Materials Obtained by Mechanical Activation." Russian Journal of Electrochemistry, vol. 45, No. 3, 2009, pp. 277-285.

Ting-Feng Yi, et al., "Enhanced cycling stability of microsized LiCoO2 cathode by Li4Ti5O12 coating for lithium ion battery," ELSEVIER Materials Research Bulletin 45 (2010) 456-459.

International Search Report from PCT/KR2013/004931 dated Aug. 21, 2013.

Bareno, et al., "Long-Range and Local Structure in the Layered Oxide Li 1.2 Co 0.4 Mn 0.4 O 2," Chemistry of Materials, vol. 23, No. 8, Mar. 25, 2011. pp. 2039-2050.

Office Action from European Application No. 13 801 317.2, dated Aug. 30, 2016.

Noh Mijung et al., "Water adsorption and storage characteristics of optimized LiCoO2 and LiNi1/3Co1/3Mn1/3O2 composite cathode material for Li-Ion cells", Journal of the Electrochemical Society, 153 (5) A935-A940 (2006).

Numata et al., "Preparation and electrochemical properties of layered lithium-cobalt-mangenese oxides", Solid State Ionics 118 (1999) 117-120.

* cited by examiner

CATHODE ACTIVE MATERIAL FOR SECONDARY BATTERY WITH ENHANCED LIFESPAN CHARACTERISTICS AND METHOD OF PREPARING THE SAME

CROSS-REFERENCE TO RELATED APPLICATIONS

The present application is a continuation of International Application No. PCT/KR2013/004931 filed Jun. 4, 2013, which claims priority from Korean Application No. 10-2012-0059526filed Jun. 4, 2012, in the Korean Intellectual Property Office, the disclosures thereof are incorporated herein by reference.

TECHNICAL FIELD

The present invention relates to a cathode active material for secondary batteries that has enhanced lifespan characteristics and a method of preparing the same.

BACKGROUND ART

As mobile device technology continues to develop and demand therefor continues to increase, demand for secondary batteries as energy sources is rapidly increasing. Among these secondary batteries, lithium secondary batteries, which exhibit high energy density and operating potential and have long cycle lifespan and a low self-discharge rate, are commercially available and widely used.

In addition, as interest in environmental problems is recently increasing, research into electric vehicles (EVs), hybrid EVs (HEVs), and the like that can replace vehicles using fossil fuels, such as gasoline vehicles, diesel vehicles, and the like, which are one of the main causes of air pollution, is actively underway.

As a power source of EVs, HEVs, and the like, a nickel metal-hydride secondary battery is mainly used. However, research into lithium secondary batteries having high energy density, high discharge voltage and output stability is actively underway and some such lithium secondary batteries are commercially available.

In particular, lithium secondary batteries used in EVs require high energy density, high short-term power output, and use for 10 years or longer under harsh conditions and thus need to have much higher safety and longer lifespan than existing small lithium secondary batteries.

In a lithium ion secondary battery used in conventional small batteries, in general, a cathode is formed of a lithium cobalt oxide having a layered structure such as $LiCoO_2$ and an anode is formed of a graphite-based material.

Lithium cobalt oxides are currently widely used due to excellent physical properties such as excellent cycle characteristics as compared to $LiNiO_2$ and $LiMn_2O_4$. However, such lithium cobalt oxides are disadvantageous in that cobalt (Co) is eluted at high voltage or under high-temperature conditions.

To address these problems, technology for partially substituting Co with Al, Mg, B, or the like or technologies for surface treatment of a lithium cobalt oxide with a metal oxide such as $Al_2O_3$, $Mg_2O$, $TiO_2$, or the like are known.

However, when Co is partially substituted with the above-described metals or a surface of a lithium cobalt oxide is coated with a metal oxide, specific capacity may decrease due to addition of a coating material that does not directly participate in charge and discharge reaction, and a metal oxide with very low electrical conductivity mainly constitutes the coating material, which results in reduced conductivity.

In addition, the coating process reduces active reaction area and thus interfacial resistance may increase and high-rate charge and discharge characteristics may be deteriorated.

Therefore, there is an urgent need to develop technology for fundamentally addressing these problems and enhancing high voltage lifespan characteristics of a lithium cobalt oxide.

DISCLOSURE

Technical Problem

The present invention aims to address the aforementioned problems of the related art and to achieve technical goals that have long been sought.

An object of the present invention is to provide a cathode active material having enhanced high voltage lifespan characteristics and including lithium cobalt oxide particles and a method of preparing the same.

Technical Solution

In accordance with one aspect of the present invention, provided is a cathode active material in which lithium cobalt oxide particles and manganese (Mn) or titanium (Ti)-containing lithium transition metal oxide particles co-exist.

The Mn or Ti-containing lithium transition metal oxide particles may be inserted into the lithium cobalt oxide particles or grain boundaries of the lithium cobalt oxide particles. The term "grain boundaries" as used herein means boundary surfaces between the lithium cobalt oxide particles.

As such, in the cathode active material according to the present invention, the Mn or Ti-containing lithium transition metal oxide particles and the lithium cobalt oxide particles co-exist and thus phase transition does not occur during high-rate charge and discharge and, since the compound consisting of Mn or Ti and the compound consisting of lithium (Li) act as a solid electrolyte, power output characteristics are enhanced.

In one non-limiting embodiment, the Mn-containing lithium transition metal oxide particles may be $Li_2MnO_3$ particles.

$Li_2MnO_3$ has very high structural stability because a mixed layer of Li and Mn is present in a layered crystal structure thereof and Mn exists as a stable tetravalent cation.

$Li_2MnO_3$ is electrochemically inert and thus is unable to be used as a cathode active material, but may be used as a cathode active material by forming a solid solution with $LiMO_2$ where M is Co, Ni, $Ni_{0.5}Mn_{0.5}$, or Mn. In this case, the solid solution exhibits flat level section characteristics in a high voltage range of 4.3 V to 4.6 V during charging and thus may enhance overall specific capacity of the cathode active material.

In another non-limiting embodiment, the Ti-containing lithium transition metal oxide particles may be $Li_2TiO_3$ particles or $Li_4Ti_5O_{12}$ particles.

$Li_4Ti_5O_{12}$ has a structurally stable spinel structure and electrochemical activity and thus may increase overall specific capacity of the cathode active material.

The Mn or Ti-containing lithium transition metal oxide particles may have a smaller or greater average diameter than the lithium cobalt oxide particles. For example, the lithium cobalt oxide particles may have a diameter of 5 μm to 30 μm, the transition metal oxide particles may have a diameter of 5 μm or less, and the final material may have a structure in which $LiCoO_2$ and $Li_2MnO_3$ (or $Li_2TiO_3$, $Li_4Ti_5O_{12}$, or the like) are separately present or $Li_2MnO_3$ is inserted into $LiCoO_2$, thus being present only in the form of $LiCoO_2$.

The cathode active material may further include an electrochemically inert lithium compound on outer surfaces of the lithium cobalt oxide particles. In particular, the lithium compound may be LiOH or $Li_2CO_3$.

In a process of preparing a general lithium cobalt oxide, a large amount of lithium impurities is present after calcination and such lithium impurities adversely affect a manufacturing process of a secondary battery and high-temperature storage characteristics of a battery cell.

However, according to a method of preparing the cathode active material, which will be described below in detail, in the cathode active material including lithium cobalt oxide particles, a Mn or Ti-containing lithium transition metal oxide is synthesized in a lithium cobalt oxide through reaction between lithium impurities that co-exist with the lithium cobalt oxide particles and Mn or Ti-containing compounds and, accordingly, overall structural stability of the cathode active material may be enhanced.

With regard to this, the present invention provides a method of preparing the cathode active material, including:

mixing a lithium cobalt oxide and a Mn or Ti-containing compound;

raising the temperature of the mixture to 800° C. so as to form Mn or Ti-containing lithium transition metal oxide particles; and performing calcination at a temperature of 850° C. to 950° C. so that the lithium transition metal oxide particles are inserted into lithium cobalt oxide particles or grain boundaries of the lithium cobalt oxide particles.

The mixing process may be performed by solid phase reaction or wet mixing.

In particular, the solid phase reaction may be a method of mixing a solid-phase lithium cobalt oxide and a solid-phase transition metal source compound, e.g., a compound selected from the group consisting of $MnO_2$, $MnCO_3$, MnOOH, $TiO_2$, $TiCO_3$, and TiOOH.

The wet mixing may, for example, be a method of dipping a solid-phase lithium cobalt oxide in an aqueous solution or alcohol-based solution of $Mn(CH_3COO)_3$, $Mn(CH_3COO)_2$ $MnSO_4$, $Mn(NO_3)_2$, $Ti(CH_3COO)_3$, $Ti(CH_3COO)_2$ $TiSO_4$, or $Ti(NO_3)_2$.

In the mixing process, a mix ratio of the lithium cobalt oxide to the Mn or Ti-containing compound may be determined according to a molar ratio of elements of the final product.

A detailed description of the preparation method will be provided in Examples, which will be described below.

The present invention also provides a cathode mixture for secondary batteries that includes the cathode active material described above and a cathode for secondary batteries that includes the cathode mixture.

The cathode mixture may further selectively include a conductive material, a binder, a filler, and the like, in addition to the cathode active material.

The conductive material is typically added in an amount of 1 to 30 wt % based on the total weight of the mixture including the cathode active material. There is no particular limit as to the conductive material, so long as it does not cause chemical changes in the fabricated battery and has conductivity. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between an active material and the conductive material and in binding of the active material to a current collector. The binder is typically added in an amount of 1 to 30 wt % based on the total weight of the mixture including the cathode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is optionally used as a component to inhibit cathode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The cathode according to the present invention may be manufactured by coating, on a cathode current collector, a slurry prepared by mixing the cathode mixture including the above-described compounds with a solvent such as NMP or the like and drying and pressing the coated cathode current collector.

The cathode current collector is generally fabricated to a thickness of 3 to 500 μm. The cathode current collector is not particularly limited so long as it does not cause chemical changes in the fabricated lithium secondary battery and has conductivity. For example, the cathode current collector may be made of stainless steel, aluminum, nickel, titanium, sintered carbon, aluminum or stainless steel surface-treated with carbon, nickel, titanium, or silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

The present invention also provides a lithium secondary battery including the cathode, an anode, a separator, and a lithium salt-containing non-aqueous electrolyte.

The anode may be manufactured by, for example, coating an anode mixture including an anode active material on an anode current collector and drying the coated anode current collector. As desired, the anode mixture may further include the above-described components.

Examples of the anode active material include carbon such as hard carbon and graphite-based carbon; metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me: Mn, Fe, Pb, or Ge; Me': Al, B, P, Si, Groups I, II and III elements, or halogens; $0 \leq x \leq 1$; $1 \leq y \leq 3$; and $1 \leq z \leq 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

The anode current collector is typically fabricated to a thickness of 3 to 500 μm. The anode current collector is not particularly limited so long as it does not cause chemical changes in the fabricated battery and has high conductivity. For example, the anode current collector may be made of copper, stainless steel, aluminum, nickel, titanium, sintered carbon, copper or stainless steel surface-treated with carbon, nickel, titanium, or silver, and aluminum-cadmium alloys. Similar to the cathode current collector, the anode current collector may also have fine irregularities at a surface thereof to enhance adhesion between the anode current collector and the anode active material and be used in various forms including films, sheets, foils, nets, porous structures, foams, and non-woven fabrics.

The separator is disposed between the cathode and the anode and, as the separator, a thin insulating film with high ion permeability and high mechanical strength is used. The separator generally has a pore diameter of 0.01 to 10 μm and a thickness of 5 to 300 μm. As the separator, for example, sheets or non-woven fabrics, made of an olefin-based polymer such as polypropylene; or glass fibers or polyethylene, which have chemical resistance and hydrophobicity, are used. When a solid electrolyte such as a polymer or the like is used as an electrolyte, the solid electrolyte may also serve as a separator.

The lithium salt-containing non-aqueous electrolyte consists of an electrolyte and a lithium salt. The electrolyte may be a non-aqueous organic solvent, an organic solid electrolyte, an inorganic solid electrolyte, or the like.

Examples of the non-aqueous organic solvent include non-protic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include, but are not limited to, nitrides, halides and sulfates of lithium (Li) such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the non-aqueous electrolyte and examples thereof include, but are not limited to, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imides.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the electrolyte.

If necessary, in order to impart incombustibility, the electrolyte may further include halogen-containing solvents such as carbon tetrachloride and ethylene trifluoride. Further, in order to improve high-temperature storage characteristics, the non-aqueous electrolyte may further include carbon dioxide gas, fluoro-ethylene carbonate (FEC), propene sultone (PRS), fluoro-propylene carbonate (FPC), or the like.

The secondary battery according to the present invention may be used in a battery cell used as a power source of small devices and may also be used as a unit battery of a medium and large-scale battery module including a plurality of battery cells.

The present invention also provides a battery pack including the battery module as a power source of a medium and large-scale device. Examples of the medium and large-scale device include, but are not limited to, electric vehicles (EVs), hybrid EVs (HEVs), and plug-in HEVs (PHEVs); and devices for storing power.

BRIEF DESCRIPTION OF THE DRAWINGS

The above and other objects, features and other advantages of the present invention will be more clearly understood from the following detailed description taken in conjunction with the accompanying drawings, in which.

MODE FOR INVENTION

Now, the present invention will be described in more detail with reference to the accompanying drawings and the following examples. These examples are only provided for illustration of the present invention and should not be construed as limiting the scope and spirit of the present invention.

EXAMPLE 1

Solid-phase $LiCoO_2$ and solid-phase $MnCO_3$ were mixed and calcined at a temperature of 890° C. to 930° C. to prepare $LiCoO_2$ treated with the Mn source, the Mn-treated $LiCoO_2$, a conductive material, and a binder were weighed so as to have a weight ratio of 95:2.5:2.5, added to NMP and mixed therein to prepare a cathode mixture, and the cathode mixture was coated on 20 μm thick Al foil, and the coated Al foil was pressed and dried, thereby completing fabrication of an electrode. The electrode was subjected to blanking into a coin shape, and the coin-shaped electrode, Li metal as an anode, and a carbonate electrolyte containing 1M $LiPF_6$ were used to manufacture a coin cell.

EXAMPLE 2

Solid-phase $LiCoO_2$ was immersed in an aqueous $MnSO_4$ solution and calcined at a temperature of 890° C. to 930° C. for 10 hours to prepare $LiCoO_2$ treated with the Mn source, the Mn-treated $LiCoO_2$, a conductive material, and a binder were weighed so as to have a weight ratio of 95:2.5:2.5, added to NMP and mixed therein to prepare a cathode mixture, and the cathode mixture was coated on 20 μm thick Al foil to a thickness of 200 μm, and the coated Al foil was pressed and dried, thereby completing fabrication of an electrode. The electrode was subjected to blanking into a coin shape, and the coin-shaped electrode, Li metal as an anode, and a carbonate electrolyte containing 1M $LiPF_6$ were used to manufacture a coin cell.

COMPARATIVE EXAMPLE

A coin cell was manufactured in the same manner as in Example 1, except that $LiCoO_2$ not treated with a Mn source (Bare $LiCoO_2$) was used.

EXPERIMENTAL EXAMPLE 1

Figure 1:
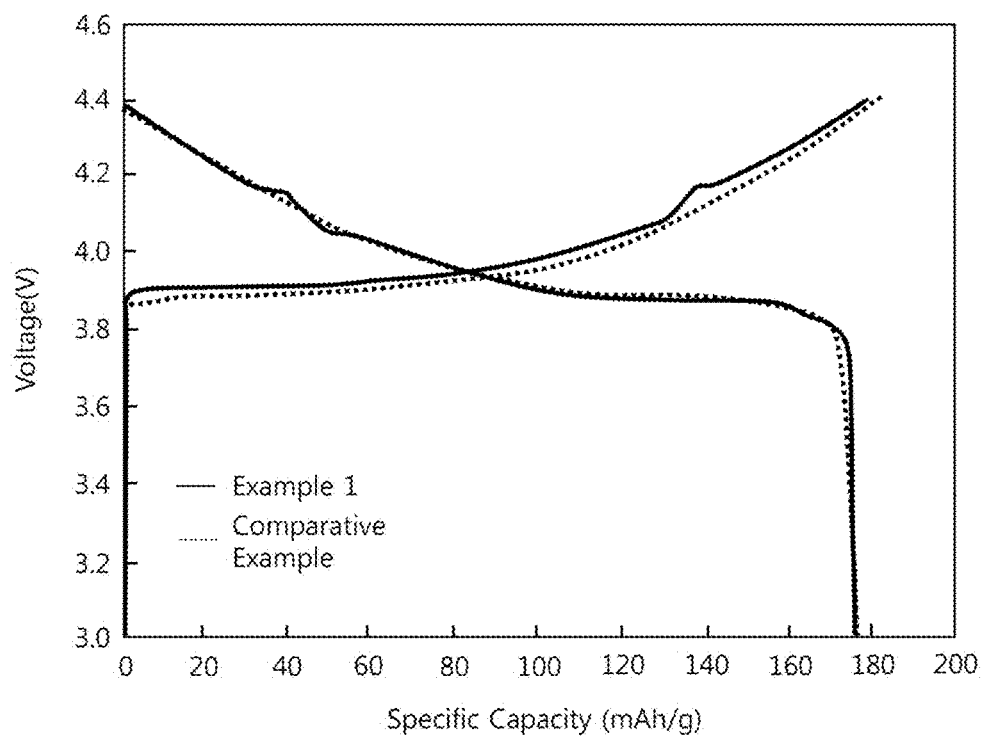
FIG. 1 is a graph showing comparison in initial charge and discharge efficiency between batteries according to Example 1 and Comparative Example.

The cells of Example 1 and Comparative Example were subjected to charging and discharging at 3.0 to 4.4 V under the following conditions: charging at 0.1 C and discharging at 0.1 C (1 C=150 mA/g) and initial charge and discharge efficiencies thereof were compared. Results are shown in Table 1 and FIG. 1 below.

TABLE 1

|  | Unit | Comparative Example | Example 1 |
| --- | --- | --- | --- |
| $1^{st}$ charge | mAh/g | 181.0 | 177.7 |
| $1^{st}$ discharge |  | 175.4 | 175 |
| Efficiency | % | 96.9 | 98.5 |

EXPERIMENTAL EXAMPLE 2

Figure 2:
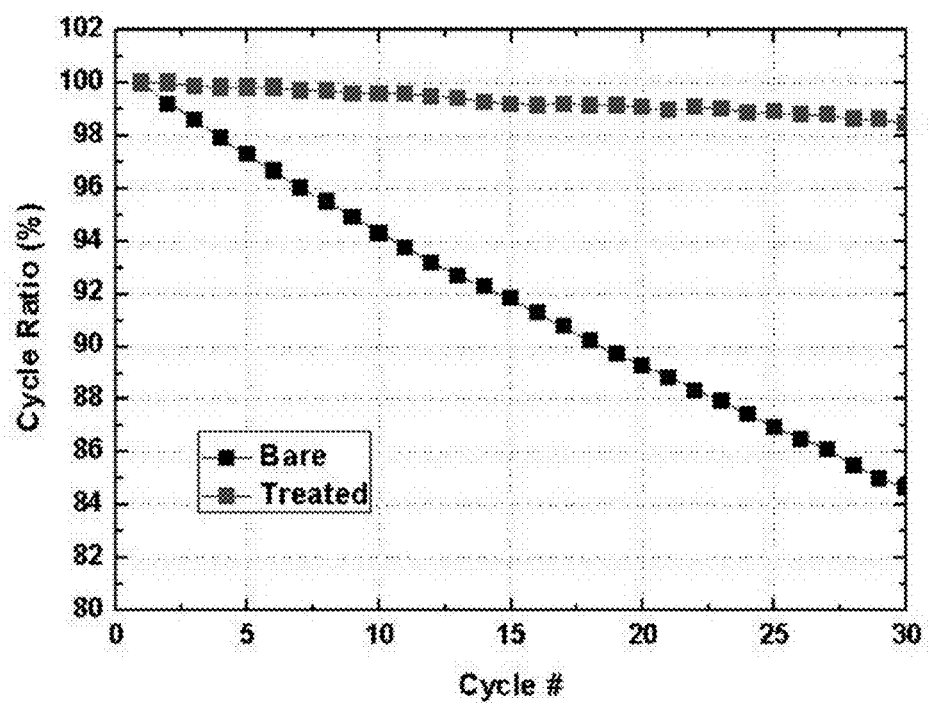
FIGS. 2 and 3 are graphs showing comparison between cycle characteristics of the batteries of Example 1 and Comparative Example.
Figure 3:
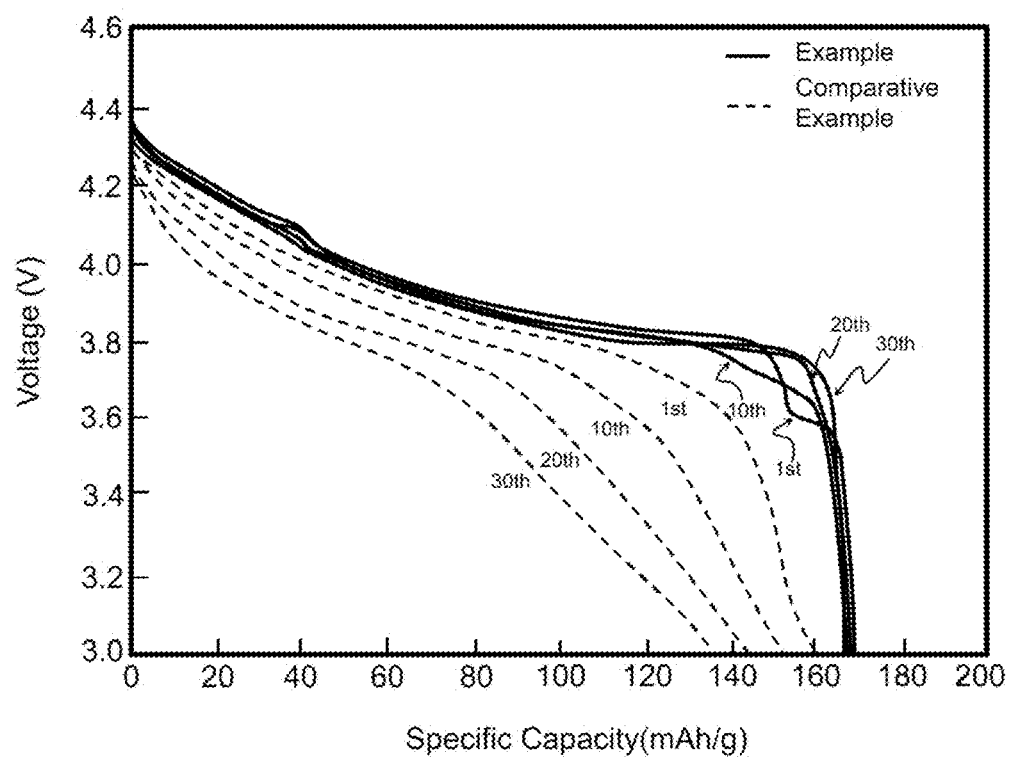

The cells of Example 1 and Comparative Example were subjected to 30 charging and discharging cycles at 3.0 to 4.4 V under the following conditions: charging at 0.5 C and discharging at 0.5 C (1 C=150 mA/g) and cycle characteristics thereof were compared. Results are shown in Table 2 below and FIGS. 2 and 3. Referring to FIG. 3, it can be confirmed that the cell of Comparative Example 1 exhibits significantly decreased specific capacity as cycles are repeated unlike the cell of Example 1.

TABLE 2

|  | Unit | Comparative Example | Example 1 |
| --- | --- | --- | --- |
| Cycle (30 times) | % | 84.6 | 98.4 |

EXPERIMENTAL EXAMPLE 3

Figure 4:
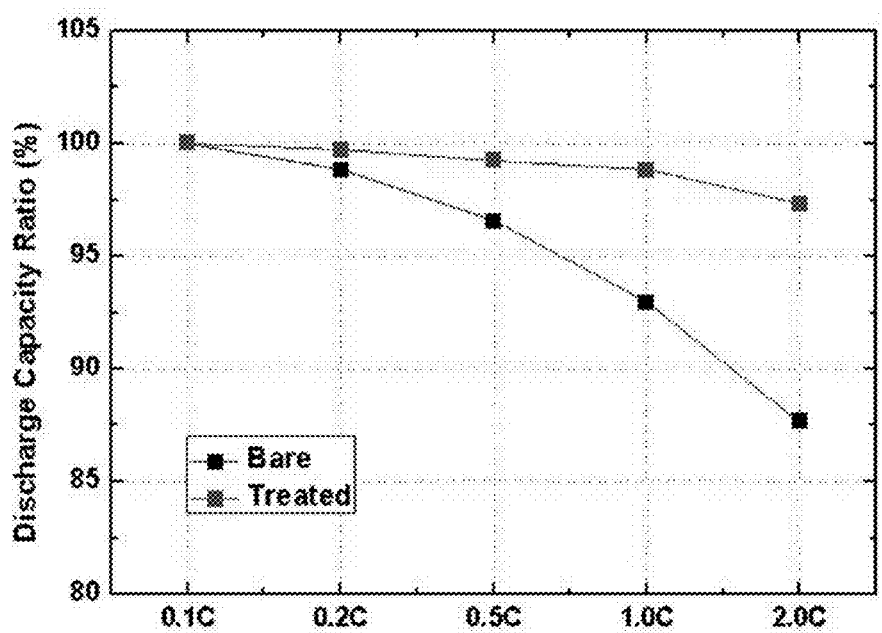
FIG. 4 is a graph showing comparison between discharge capacities according to C-rate of the batteries of Example 1 and Comparative Example.

The cells of Example 1 and Comparative Example were subjected to charging and discharging at 3.0 to 4.4 V under the following conditions: charging at 0.5 C and discharging at 0.1 C, 0.2 C, 0.5 C, 1.0 C, and 2.0 C (1 C=150 mA/g) and rate-limiting characteristics thereof were compared. Results are shown in Table 3 below and FIG. 4.

TABLE 3

|  | Unit | Comparative Example | Example 1 |
| --- | --- | --- | --- |
| 0.1 C | % | 100.0 | 100.0 |
| 0.2 C |  | 98.9 | 99.7 |
| 0.5 C |  | 96.6 | 99.3 |
| 1.0 C |  | 92.9 | 98.9 |
| 2.0 C |  | 87.7 | 97.3 |

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, a cathode active material according to the present invention has a structure in which Mn or Ti-containing lithium transition metal oxide particles produced through reaction with lithium impurities coexist with lithium cobalt oxide particles in the cathode active material and thus exhibits enhanced high-voltage lifespan characteristics and power output characteristics.

The invention claimed is:

1. A cathode active material comprising coexisting (1) lithium cobalt oxide particles including particle boundaries and (2) manganese (Mn)-containing lithium transition metal oxide particles provided by a manganese-containing compound selected from $MnO_2$, $MnCO_3$, $MnOOH$, $Mn(CH_3COO)_3$, $Mn(CH_3COO)_2$, $MnSO_4$, and $Mn(NO_3)_2$,
wherein said manganese-containing lithium transition metal oxide particles are present inside the particle boundaries of the lithium cobalt oxide particles,
wherein the lithium cobalt oxide particles have a diameter of 5 μm to 30 μm, and include a lithium deficiency layer of $Li_xCoO_2(x<1.0)$,
wherein the Mn-containing lithium transition metal oxide particles have a diameter of 5 μm or less,
wherein the diameter of the Mn-containing lithium transition metal oxide particles is smaller than the diameter of the lithium cobalt oxide particles,
wherein the Mn-containing lithium transition metal oxide particles are inserted into the particle boundaries of lithium cobalt oxide particles, and
wherein the Mn-containing lithium transition metal oxide particles comprise $Li_2MnO_3$ having a layered crystal structure and Mn exists as a stable tetravalent cation, whereby phase transition does not occur during high-rate charge and discharge.

2. The cathode active material according to claim 1, wherein the cathode active material further comprises an electrochemically inert lithium compound on outer surfaces of the lithium cobalt oxide particles.

3. The cathode active material according to claim 2, wherein the lithium compound is LiOH.

4. The cathode active material according to claim 2, wherein the lithium compound is $Li_2CO_3$.

5. A lithium secondary battery comprising the cathode active material according to claim 1.

6. A battery module comprising the lithium secondary battery according to claim 5 as a unit battery.

7. A battery pack comprising the battery module according to claim 6.

8. A device using the battery pack according to claim 7 as a power source.

9. The device according to claim 8, wherein the device is an electric vehicle, a hybrid electric vehicle, a plug-in hybrid electric vehicle, or a device for storing power.

* * * * *